(12) United States Patent
Chen et al.

(10) Patent No.: US 11,500,476 B1
(45) Date of Patent: Nov. 15, 2022

(54) DUAL-TRANSCEIVER BASED INPUT DEVICES

(71) Applicant: Hewlett-Packard Development Company, L.P., Spring, TX (US)

(72) Inventors: Chung-Chun Chen, Taipei (TW);
Chih-Ming Huang, Taipei (TW);
Ming-Shien Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/501,040

(22) Filed: Oct. 14, 2021

(51) Int. Cl.
| | |
|---|---|
| *G06F 3/0346* | (2013.01) |
| *G06F 3/038* | (2013.01) |
| *G06F 3/01* | (2006.01) |
| *H04W 4/80* | (2018.01) |
| *G08G 9/02* | (2006.01) |
| *G08B 21/02* | (2006.01) |
| *A63F 13/212* | (2014.01) |

(52) U.S. Cl.
CPC ............ *G06F 3/0346* (2013.01); *G06F 3/011* (2013.01); *G06F 3/038* (2013.01); *G08B 21/02* (2013.01); *G08G 9/02* (2013.01); *H04W 4/80* (2018.02); *A63F 13/212* (2014.09); *A63F 2300/8082* (2013.01); *G06F 2203/0384* (2013.01)

(58) Field of Classification Search
None
See application file for complete search history.

(56) References Cited

U.S. PATENT DOCUMENTS

| | | |
|---|---|---|
| 9,779,605 B1 | 10/2017 | Taylor |
| 2018/0189568 A1 | 7/2018 | Powderly |
| 2018/0276969 A1 | 9/2018 | Obaidi |
| 2019/0227312 A1 | 7/2019 | Lai |

*Primary Examiner* — Aneeta Yodichkas
(74) *Attorney, Agent, or Firm* — HPI Patent Department (57) ABSTRACT

In an example, a wearable apparatus may include a display device and an input device. The input device may include a network interface device having a first transceiver and a second transceiver. Further, the input device may include a processor connected to the network interface device to communicate with the display device via the first transceiver. Furthermore, the processor may monitor a position of a peer input device via the second transceiver based on a radio signal exchanged between the input device and the peer input device. In response to a determination that the position of the peer input device is less than a threshold distance, the processor may generate a collision alert on the display device via the first transceiver.

20 Claims, 5 Drawing Sheets

DUAL-TRANSCEIVER BASED INPUT DEVICES

BACKGROUND

Virtual reality (VR) devices are used for different applications. For example, a user wears and operates a VR headset (e.g., a head-mounted display (HMD) device) to view content, play a video game, conduct a virtual meeting, or perform other online-related activities. Such VR devices receive input from remote input devices to control input interfaces for objects in virtual environments and augmented reality environments. For example, a user may wear the HMD device connected to a game machine and play a game by operating a controller while watching a screen displayed on the HMD device.

BRIEF DESCRIPTION OF THE DRAWINGS

Examples are described in the following detailed description and in reference to the drawings, in which.

DETAILED DESCRIPTION

Modern computing and display technologies have facilitated development of systems for "Virtual reality" (VR), "augmented reality" (AR), or "mixed reality" (MR) experiences, where digitally reproduced images or portions thereof are presented to a user in a manner where they seem to be, or may be perceived as, real. A VR scenario may involve presentation of digital or virtual image information without transparency to other actual real-world visual input. An AR scenario may involve presentation of digital or virtual image information as an augmentation to visualization of the actual world around the user. Further, a MR scenario may be related to merging real and virtual worlds to produce new environments where physical and virtual objects co-exist and interact in real-time.

In such scenarios, users can explore the virtual environment using a head-mounted display (HMD) device, often in conjunction with an input device. The HMD devices can take a variety of forms such as glasses, goggles, helmets, and the like. The HMD devices may display a virtual environment in front of user's eyes. The input device may exchange commands and data with the HMD device through either a wired or wireless connection. An example input device may be a gaming controller, an electronic pen, a joystick, or any other device that allows a user to respond to information displayed on the HMD device through a touch, gesture, proximity, hovering input, or the like. For example, a user may wear and operate the HMD device to view content, play a video game, conduct a virtual meeting, or perform other online-related activities, using the input device. Further, the users may explore the virtual world by moving through the physical environment, where such movements correspond to and control movements in the virtual world.

In such scenarios, wearing the HMD device may allow the user to watch nothing but the image displayed on a display panel of the HMD device. In other words, the user becomes immersed in the presented virtual reality and less aware of other users in the physical environment (e.g., a room). The isolation of the user from the physical surroundings may not be an issue when the user is stationary but poses an issue once the user is mobile, particularly, in multi-player or multi-user scenarios. For example, in a multiplayer game, a group of users can play a video game together from a same physical environment, which puts the users in a position where real life collisions may be a risk. In such a multi-user scenario, lack of the users' location detection and warning messages may lead to collision between the users.

Some example methods may assist users in collision avoidance in a virtual reality environment by tracking a location, speed, and direction of movement of a first user and a second user in the physical environment. However, such methods may use external location tracking systems that receive an image of the user's environment, analyze the image, and generate a collision alert based on the analysis of the image. In such example methods, analyzing the image may involve complex imaging processing functionalities. Also, the location tracking systems may include multiple image sensors to capture image data of the users, which may involve additional cost.

Examples described herein may provide a wearable device including an input device to assist users in collision avoidance in a multi-user environment. The wearable device may include a display device (e.g., a head-mounted display (HMD) device) and the input device to exchange commands and data with the HMD device. The input device may include a network interface device and a processor. The network interface device may include a first transceiver (e.g., a wired transceiver or a wireless transceiver) to communicate with the HMD device and a second transceiver (e.g., a wireless transceiver) to monitor a position of a peer input device associated with another HMD device.

During operation, the processor may utilize the second transceiver to monitor a position of the peer input device relative to the input device based on a radio signal exchanged between the input device and the peer input device. When the position of the peer input device is less than a threshold distance, the processor may utilize the first transceiver to generate a collision alert on the HMD device. Thus, examples described herein may generate the collision alert to avoid collision between the users in the multi-user environment.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Figure 1:
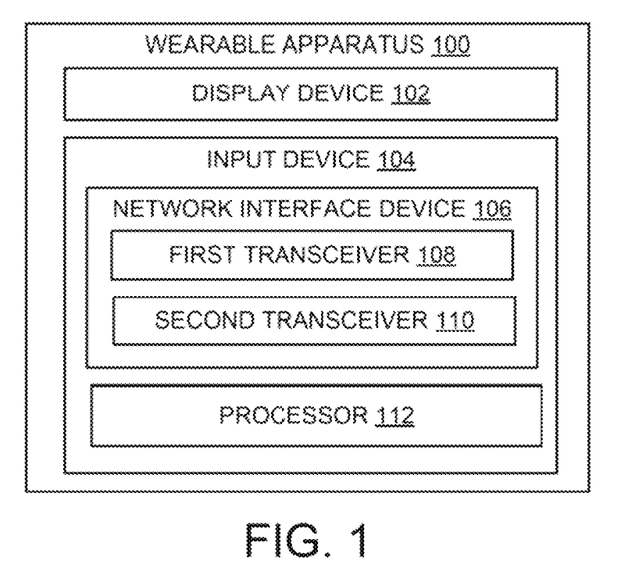
FIG. 1 is a block diagram of an example wearable apparatus, including a processor to generate a collision alert based on a position of a peer input device.

Turning now to the figures, FIG. 1 is a block diagram of an example wearable apparatus 100, including a processor 112 to generate a collision alert based on a position of a peer input device. Example wearable apparatus 100 may present two-dimensional (2D) or three-dimensional (3D) virtual images (i.e., virtual content) to a user. The images may be still images, frames of a video, or a video, or in any combinations thereof. Further, wearable apparatus 100 can present the virtual content in a Virtual Reality (VR) environment, an Augmented Reality (AR) environment, or a Mixed Reality (MR) environment for user interaction.

As shown in FIG. 1, wearable apparatus 100 includes a display device 102 to present the virtual content. For example, display device 102 may be a head-mounted display (HMD) device such as a VR headset. In an example, the HMD device may connect to a computing device capable of executing (e.g., running) programs to generate a reality in the case of a VR, or to enhance the reality in the case of an AR. The HMD device may use an input from a computer program (e.g., a VR program and/or an AR program running in the computing device) to allow a wearer to experience the VR and/or the AR. The HMD device may be connected to the computing device executing the VR and/or AR program via a wired connection or a wireless connection.

As used herein, the HMD device may refer to a device worn on a head which may display visual data to the user. In an example multiplayer game, a group of users can play a video game together in a physical location. Each user may operate a VR headset to play a role in the video game. The VR headsets may display a high-resolution graphical user interface, plays 3D audio, and provides a voice service for communication with other users. Similarly, the VR headset can be used for other applications such as to view content, conduct a virtual meeting, or perform other online-related activities.

Further, wearable apparatus 100 includes an input device 104 by which the user can input a command to interact with display device 102. For example, input device 104 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to display device 102. Input device 104 may be held by the user's hand during the use of wearable apparatus 100. The input device 104 can be in a wired communication or a wireless communication with display device 102.

Furthermore, input device 104 includes a network interface device 106 having a first transceiver 108 and a second transceiver 110. The term "transceiver" may refer to a device or circuit that is able to both transmit and receive analog and/or digital signals through a transmission medium.

Furthermore, input device 104 includes processor 112 connected to network interface device 106. As used herein, the term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. A processor may, for example, include single or multiple cores on a chip, multiple cores across multiple chips, multiple cores across multiple devices, or suitable combinations thereof. A processor may be functional to fetch, decode, and execute instructions as described herein.

During operation, processor 112 may communicate with display device 102 via first transceiver 108. Further, processor 112 may monitor a position of the peer input device via second transceiver 110 based on a radio signal exchanged between input device 104 and the peer input device.

In an example, processor 112 may utilize first transceiver 108 to communicate with display device 102 via a wired connection (e.g., a USB connection) to transmit and/or receive a signal. Further, processor 112 may utilize second transceiver 110 to monitor the position of the peer input device via a wireless channel (e.g., a Bluetooth channel, a Wi-Fi channel, an Ultra-wideband (UWB) communication channel, a Near-Field Communication (NFC) channel, a Zigbee communication channel, an Infrared communication channel, or the like).

In another example, processor 112 may utilize first transceiver 108 to communicate with display device 102 via a first wireless channel to transmit and/or receive the signal. Further, processor 112 may utilize second transceiver 110 to monitor the position of the peer input device via a second wireless channel. The first channel and the second channel may be implemented in accordance with a short-range wireless communication protocol (e.g., a Bluetooth protocol).

In an example, processor 112 may measure an angle-of-arrival (AoA) of the radio signal received by input device 104 and track the position of the peer input device to monitor a distance based on the measured AoA. In another example, processor 112 may measure an angle-of-departure (AoD) of the radio signal from input device 104 and track the position of the peer input device to monitor a distance based on the measured AoD.

In yet another example, processor 112 may measure a time-of-flight (ToF) of the radio signal transmitted and received back by second transceiver 110. Further, processor 112 may track the location of the peer input device to monitor the distance based on the measured ToF. Further, in response to a determination that the position of the peer input device is less than a threshold distance, processor 112 may generate a collision alert on display device 102 via first transceiver 108.

An example collision alert may be visual (e.g., a modified avatar, text, highlighting portion, or lighting in the VR environment), audio (e.g., a cautionary announcement or warning sound), and/or physical cues (e.g., vibration in display device 102, input device 104, or any other object associated with the user). The collision alert may be variable in intensity (e.g., increasing intensity as the risk of collision increases) or may be binary (i.e., on/off). In addition, the collision alert may be positioned within a space to identify a direction of the collision. For example, an image, sound, or vibration to the user's left may indicate that the danger is to the user's left.

Figure 2A:
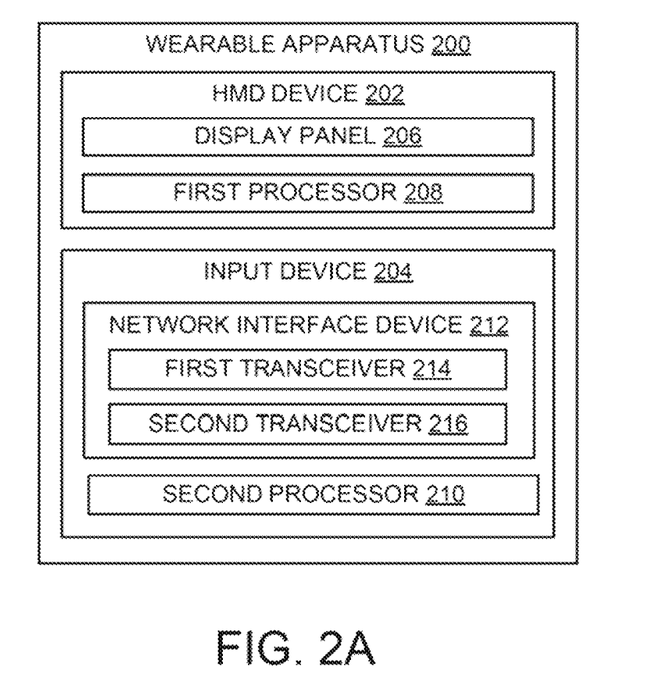
FIG. 2A is a block diagram of an example wearable apparatus, including a first processor to generate a collision alert on a head-mounted display (HMD) device based on location data received from an input device.

FIG. 2A is a block diagram of an example wearable apparatus 200, including a first processor 208 to generate a collision alert on an HMD device 202 based on location data received from an input device 204. As shown in FIG. 2A, wearable apparatus 200 includes HMD device 202. HMD device 202 includes a display panel 206 and first processor 208. For example, HMD device 202 may be a VR HMD device, an AR HMD device, or a MR HMD device.

Further, wearable apparatus 200 includes input device 204 to exchange a command and data with HMD device 202. In an example, input device 204 may be a wearable device or a hand-held device. The term "hand-held device" may refer to a device that can be held by a wearer of HMD device 202. An example hand-held device may include a keyboard, a set of control buttons, a joystick, a touchable structure, a gesture recognition module, or the like. The term "wearable device" may refer to a device that can be worn by a user of HMD device 202. An example wearable device may include a wrist band, a body-mounted sensor, or the like. Further, input device 204 includes a network interface device 212 having a first transceiver 214 and a second transceiver 216. Furthermore, input device 204 includes a second processor 210.

During operation, second processor 210 may utilize first transceiver 214 to communicate with HMD device 202 via a first wireless channel. Further, second processor 210 may utilize second transceiver 216 to monitor a distance between input device 204 and a peer input device via a second wireless channel. In an example, second processor 210 may measure an AoA of a radio signal and track a location of the peer input device to monitor the distance based on the measured AoA. In another example, second processor 210 may measure an AoD of a radio signal and track a location of the peer input device to monitor the distance based on the measured AoD.

Furthermore, in response to a determination that the distance is less than a threshold, second processor 210 may transmit location data of the peer input device to HMD device 202 via first transceiver 214. Further, first processor 208 may generate a collision alert on display panel 206 based on the location data. In an example, the collision alert may visually indicate a direction of potential collision with the peer input device. For example, the collision alert may visually indicate a defined warning color on a display area along a boundary of display panel 206. For example, the display area may include a right side, left side, top side, bottom side, a top right corner, a top left corner, a bottom right corner, or a bottom left corner of display panel 206 depending on the position of the peer input device.

Figure 2B:
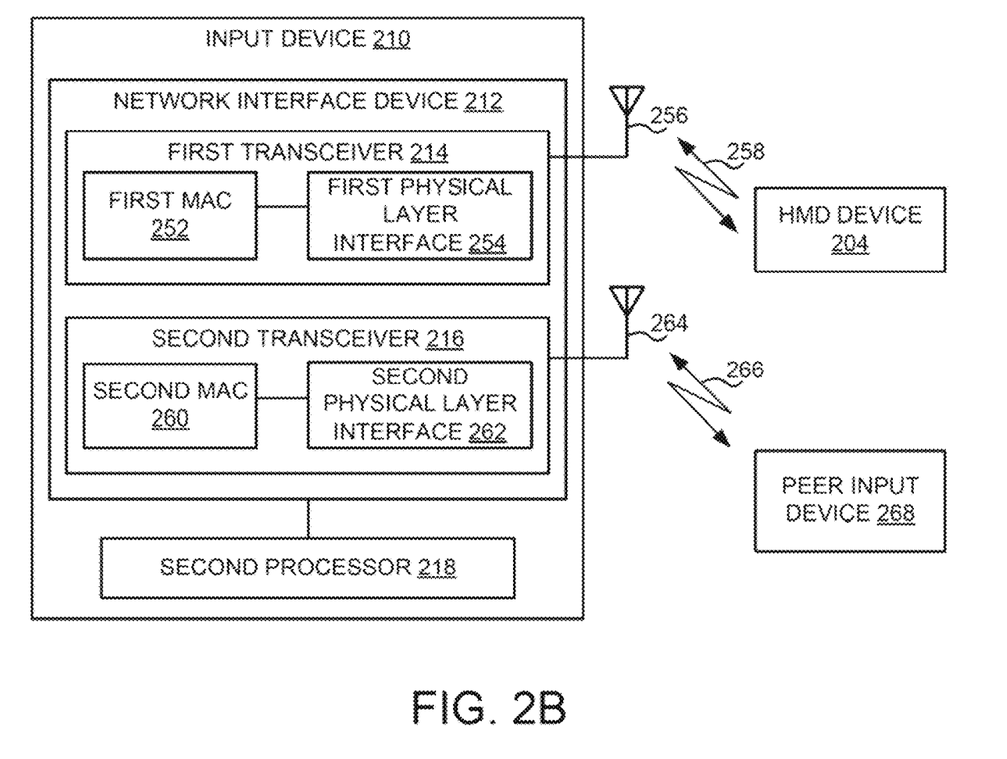
FIG. 2B is a block diagram of the example input device of FIG. 2A, depicting additional features.

FIG. 2B is a block diagram of example input device 204 of FIG. 2A, depicting additional features. For example, similarly named elements of FIG. 2B may be similar in structure and/or function to elements described with respect to FIG. 2A. As shown in FIG. 2B, first transceiver 214 may include a first media access controller (MAC) 252 (e.g., a first MAC layer) and a first physical layer interface 254 to communicate with HMD device 202 via a first wireless channel 258. Further, second transceiver 216 may include a second MAC 260 (e.g., a second MAC layer) and a second physical layer interface 262 to monitor the distance between input device 204 and peer input device 268 via a second wireless channel 266. In an example, first transceiver 214 and second transceiver 216 may be implemented in a single chip (e.g., an integrated circuit). In another example, first transceiver 214 and second transceiver 216 may be implemented in separate chips.

First MAC 252 may have a first MAC address to communicate with HMD device 202 via first physical layer interface 254. Further, second MAC 260 may have a second MAC address to communicate with peer input device 268 via second physical layer interface 262 to monitor the position of peer input device 268 relative to input device 204. Further, physical layer interfaces 254 or 262 may send and receive data packets. For example, first physical layer interface 254 may be connected to or provided with an antenna 256 to facilitate communication with HMD device 202 via first wireless channel 258 (e.g., a data channel or a scan channel). Further, second physical layer interface 262 may be connected to or provided with an antenna 264 to facilitate communication with peer input device 268 via second wireless channel 266 (e.g., a data channel or a scan channel). In an example, first MAC 252 may operate between an upper network layer (e.g., a logical link control layer) and first physical layer interface 254. Similarly, second MAC 260 may operate between the upper network layer and second physical layer interface 262. Further, second processor 210 may coordinate between first MAC 252 and second MAC 260 to process data.

Figure 3:
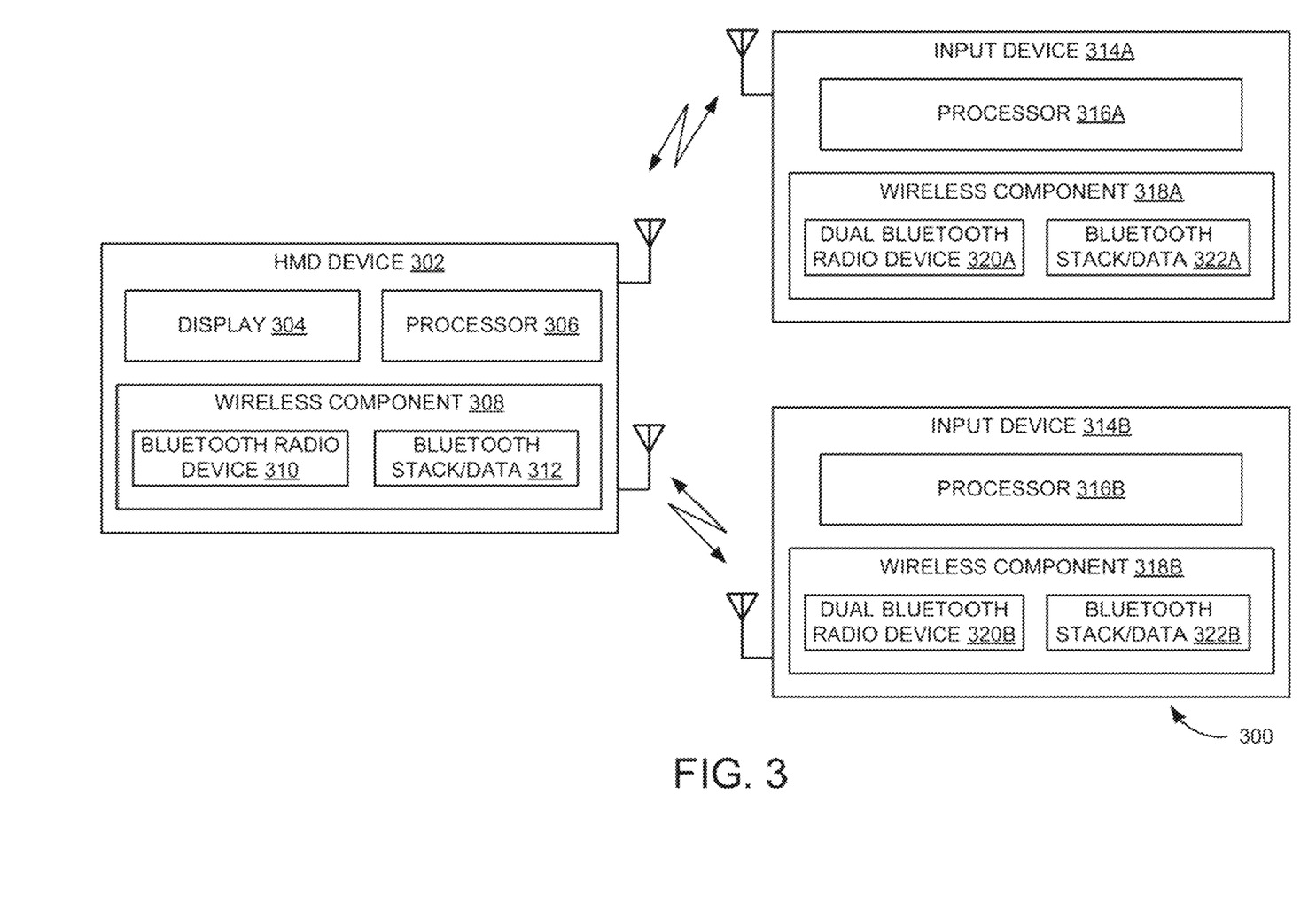
FIG. 3 is a block diagram of an example wearable apparatus, including a first input device and a second input device having a first dual Bluetooth radio device and a second dual Bluetooth radio device, respectively.

FIG. 3 is a block diagram of an example wearable apparatus 300, including a first input device 314A and a second input device 314B having a first dual Bluetooth radio device 320A and a second dual Bluetooth radio device 320B, respectively. As shown in FIG. 3, wearable apparatus 300 includes an HMD device 302. Further, wearable apparatus 300 includes first input device 314A and second input device 314B to communicate data or command to HMD device 302. In an example, first input device 314A and second input device 314B may be operable by a user wearing HMD device 302. Further, HMD device 302 includes a display 304, a processor 306, and a wireless component 308 to communicate (e.g., have been "paired") with input devices 314A and 314B. For example, processor 306 may be a part of system on a chip (SoC), which may be an integrated circuit that integrates components of HMD device (e.g., processor 306, memory, graphical user interface (GUI), and the like). Further, wireless component 308 includes a Bluetooth radio device 310 (i.e., a transceiver) and Bluetooth stack/data 312 (e.g., a program implementation of the Bluetooth protocol stack) to facilitate Bluetooth communication with input devices 314A and 314B.

Further, first input device 314A includes a processor 316A and a wireless component 318A. Furthermore, second input device 314B includes a processor 316B and a wireless component 318B. In an example, processors 316A and 316B may be part of respective SoCs of input devices 314A and 314B. Further, wireless component 318A and wireless component 318B include first dual Bluetooth radio device 320A and second dual Bluetooth radio device 320B, respectively. The term "dual Bluetooth radio device" may refer to a radio device that includes a pair of Bluetooth transceivers to wirelessly communicate with other devices in accordance with a Bluetooth protocol. Also, wireless component 318A and wireless component 318B include Bluetooth stack/data 322A and Bluetooth stack/data 322B, respectively. Example functioning of input devices 314A and 314B to detect a distance of a peer input device associated with another HMD device is described with respect to FIG. 4.

Figure 4:
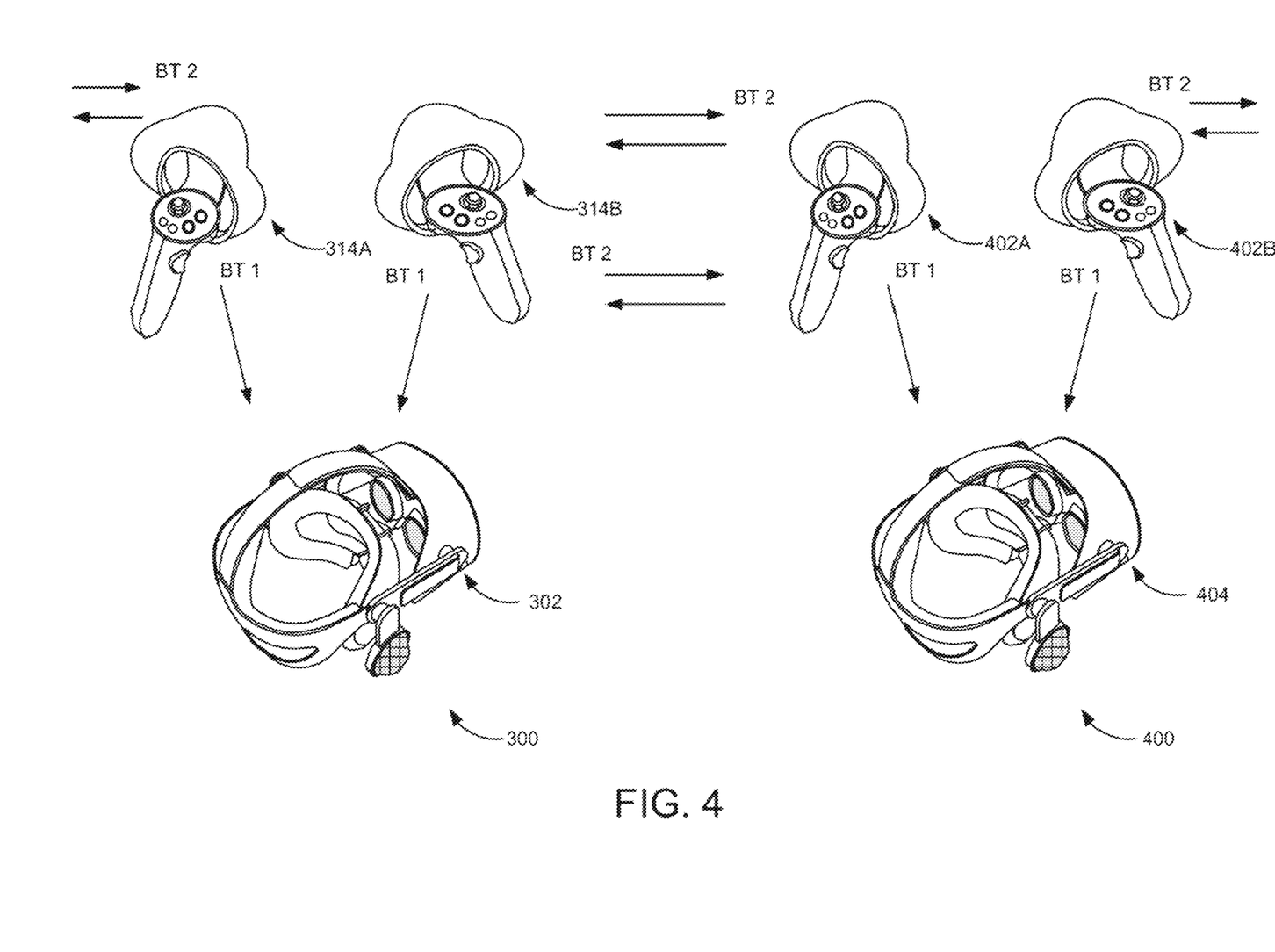
FIG. 4 is a schematic diagram of an example multi-user environment, depicting a first wearable apparatus of FIG. 3 to monitor a position of a second wearable apparatus.

FIG. 4 is a schematic diagram of an example multi-user environment, depicting first wearable apparatus 300 of FIG. 3 to monitor a position of a second wearable apparatus 400. For example, similarly named elements of FIG. 3 may be similar in structure and/or function to elements described with respect to FIG. 4. As shown in FIG. 4, first input device 314A and second input device 314B of first wearable apparatus 300 may communicate with first HMD device 302 via a respective Bluetooth transceiver (e.g., BT1). Further, second wearable apparatus 400 may include a third input device 402A and a fourth input device 402B in communication with a second HMD device 404 via a respective Bluetooth transceiver (e.g., BT1). In an example, each of input devices 314A, 314B, 402A, and 402B may include dual Bluetooth transceivers (e.g., BT1 and BT2). In the example shown in FIG. 4, second wearable apparatus 400 may be a peer wearable apparatus for first wearable apparatus 300.

During operation, when a user corresponding to HMD device 302 powers on HMD device 302 and input devices (e.g., first input device 314A and second input device 314B), Bluetooth transceivers (BT1) in the input devices 314A and 314B may connect to HMD device 302 for communicating user commands (e.g., movements). Thus, Bluetooth transceivers (BT1) in input devices 314A and 314B may communicate input data to first HMD device 302. Similarly, Bluetooth transceivers (BT1) in input devices 402A and 402B may communicate input data to second HMD device 404.

Further, processor 316A (e.g., as shown in FIG. 3) in first input device 314A may instruct Bluetooth transceiver (BT2) to keep broadcasting a Beacon signal to inform a position of input device 314A to a peer input device 402A or 402B. Also, processor 316A in first input device 314A may instruct Bluetooth transceiver (BT2) to keep receiving a Beacon signal from peer input device 402A or 402B to determine a position of peer input device 402A or 402B. In an example, the position of peer input device 402A or 402B may be determined using an AoA of the Beacon signal at first input device 314A or AoD of the Beacon signal from first input device 314A. Similar process can be implemented in input devices 314B, 402A, and 402B to determine a position of peer input devices. For example, Bluetooth transceiver (BT2) in second input device 314B may monitor a position of peer input device 402A or 402B via an AoA or AoD signal. Furthermore, when Bluetooth transceiver (BT2) identifies that there is another input device in proximity (e.g., when the monitored distance is less than a threshold distance), Bluetooth transceiver (BT2) may communicate the distance and the angle of the peer input device 402A or 402B to processor 316A. Further, processor 316A may send the information to HMD device 302 via Bluetooth transceiver (BT1). HMD device 302, upon receiving the information, may warn the user of HMD device 302 to avoid collision.

Figure 5:
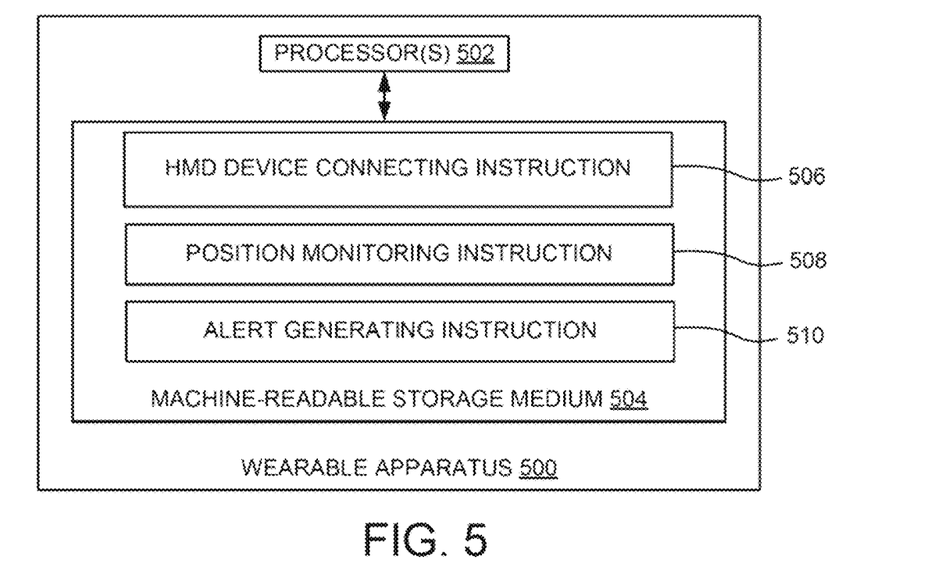
FIG. 5 is a block diagram of an example wearable apparatus including a non-transitory machine-readable storage medium, storing instructions to generate a multi-stage collision alert based on a monitored position of a peer input device.

FIG. 5 is a block diagram of an example wearable apparatus 500 including a non-transitory machine-readable storage medium 504, storing instructions to generate a multi-stage collision alert based on a monitored position of a peer input device. Wearable apparatus 500 includes a processor 502 and machine-readable storage medium 504 communicatively coupled through a system bus. Processor 502 may be any type of CPU, microprocessor, or processing logic that interprets and executes machine-readable instructions stored in machine-readable storage medium 504.

Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, and the like, or storage memory media such as a floppy disk, a hard disk, a CD-ROM, a DVD, a pen drive, and the like. In an example, machine-readable storage medium 504 may be a non-transitory machine-readable medium, where the term "non-transitory" does not encompass transitory propagating signals. In an example, machine-readable storage medium 504 may be remote but accessible to wearable apparatus 500.

Machine-readable storage medium 504 stores instructions 506, 508, and 510. In an example, wearable apparatus 500 may include an HMD device and an input device to input data or command to the HMD device. In an example, processor 502 may be implemented as part of the HMD device, the input device, or a combination thereof.

Instructions 506 may be executed by processor 502 to utilize a first transceiver of an input device to communicate with the HMD device via a first wireless channel. In an example, instructions to utilize the first transceiver to communicate with the HMD may include instructions to utilize the first transceiver having a first MAC and a first physical layer interface to perform data communication and command communication with the HMD device. The first physical layer interface may be an interface between the first transceiver and the first wireless channel.

Instructions 508 may be executed by processor 502 to utilize a second transceiver of the input device to monitor a position of a peer input device relative to the input device in a physical environment via a second wireless channel. In an example, instructions to utilize the second transceiver to monitor the position of the peer input device may include instructions to utilize the second transceiver having a second MAC and a second physical layer interface to monitor the position of the peer input device relative to the input device. The second physical layer interface may be an interface between the second transceiver and the second wireless channel.

In an example, the first wireless channel and the second wireless channel may exchange communications in accordance with a wireless communication protocol. For example, the first transceiver may be a first Bluetooth transceiver and the second transceiver may be a second Bluetooth transceiver. Further, the first wireless channel may be a first Bluetooth channel and the second wireless channel may be a second Bluetooth channel.

Instructions 510 may be executed by processor 502 to generate a multi-stage collision alert based on the monitored position of the peer input device. In an example, the multi-stage collision alert may include a visual alert outputted on a display panel of the HMD device, an audible alert outputted via an audio device of the HMD device, a haptic/vibration alert outputted via the input device, or any combination thereof.

In an example, instructions to generate the multi-stage collision alert may include instructions to:
  generate a first collision alert when the monitored position of the peer input device relative to the input device falls below a first threshold distance, and
  generate a second collision alert when the monitored position of the peer input device relative to the input device falls below a second threshold distance. In an example, the second collision alert may be different than the first collision alert. Further, the second threshold distance may be less than the first threshold distance.

In an example, the first collision alert may visually indicate a direction of potential collision with the peer input device in a first color (e.g., orange) and the second collision alert may visually indicate a direction of potential collision with the peer input device in a second color (e.g., red). In another example, the first collision alert and the second collision alert may include haptic/vibration alerts with different intensities that can be outputted via the input device. Similarly, the first collision alert and the second collision alert may include different types of alerts to indicate a distance and direction of potential collision with the peer input device.

Figure 6:
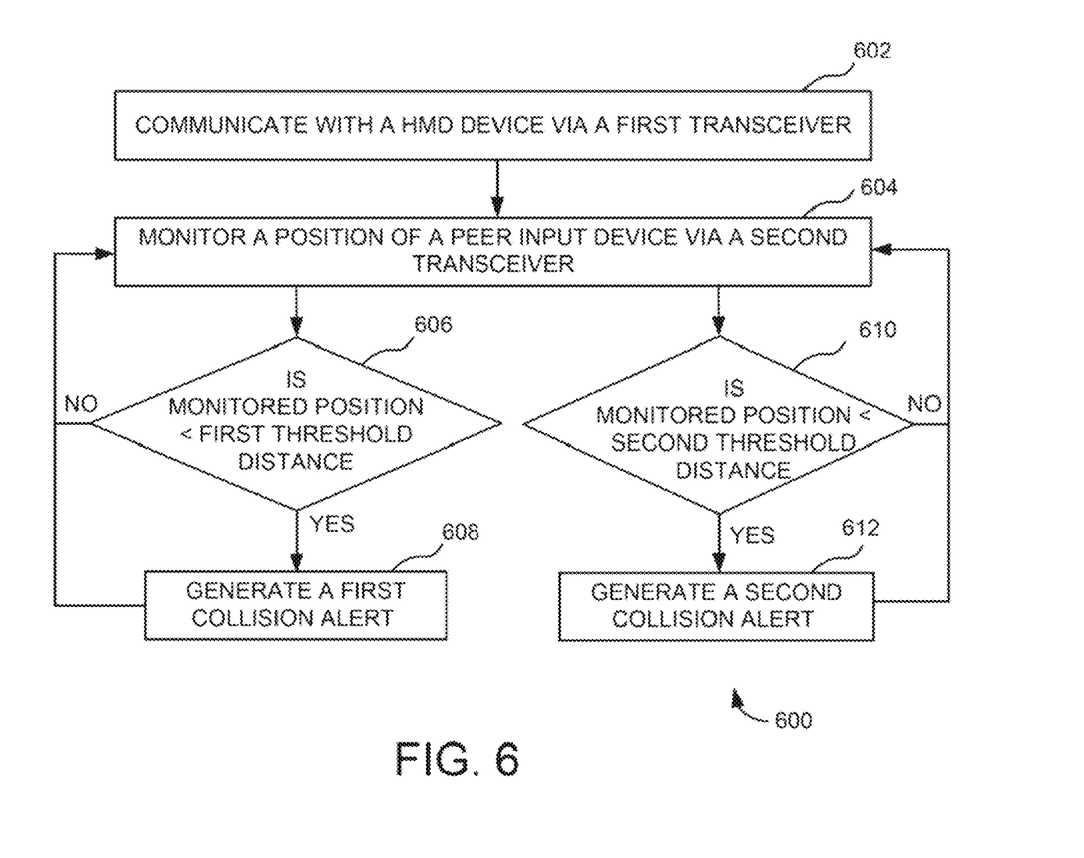
FIG. 6 is a flowchart illustrating an example process for generating a multi-stage collision alert based on a monitored position of a peer input device.

FIG. 6 is a flowchart illustrating an example process 600 for generating a multi-stage collision alert based on a monitored position of a peer input device. The process depicted in FIG. 6 represents generalized illustrations, and those other processes may be added, or existing processes may be removed, modified, or rearranged without departing from the scope and spirit of the present application. In addition, the process may represent instructions stored on a computer-readable storage medium that, when executed, may cause a processor to respond, to perform actions, to change states, and/or to make decisions. Alternatively, the process may represent functions and/or actions performed by functionally equivalent circuits like analog circuits, digital signal processing circuits, application specific integrated circuits (ASICs), or other hardware components associated with the system. Furthermore, the flow chart is not intended to limit the implementation of the present application, but rather the flow chart illustrates functional information to design/fabricate circuits, generate machine-readable instructions, or use a combination of hardware and machine-readable instructions to perform the illustrated process.

At 602, an input device of a wearable apparatus may communicate with a corresponding HMD device via a first transceiver of a network interface device. In an example, the wearable apparatus may include the HMD device and the input device.

At 604, the input device may monitor a position of a peer input device relative to the input device in a physical environment via a second transceiver of the network interface device. In an example, the peer input device may correspond to another HMD device.

At 606, a check may be made to determine whether the monitored position is less than a first threshold distance. For example, consider that the first threshold distance as 7 mts. When the monitored distance is less than the first threshold distance (e.g., 7 mts), a first collision alert may be generated, at 608. Example first collision alert may include a message to warn a first risk of collision. Further, the process of monitoring position of the peer input device may be continued (e.g., when the monitored distance is not less than the first threshold distance or upon generating the first collision alert).

At 610, a check may be made to determine whether the monitored position is less than a second threshold. The second threshold distance is less than the first threshold distance. For example, consider that the second threshold distance is 4 mts. When the monitored distance is less than the second threshold (e.g., 4 mts), a second collision alert may be generated, at 612. Example second collision alert may include a message to warn a second risk of collision. The second risk of collision may be greater than the first risk of collision. Further, the process of monitoring position of the peer input device may be continued (e.g., when the monitored distance is not less than the second threshold distance or upon generating the second collision alert).

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A wearable apparatus comprising:
   a display device; and
   an input device comprising:
   a network interface device including:
   a first transceiver; and
   a second transceiver; and
   a processor connected to the network interface device to:
   communicate with the display device via the first transceiver;
   monitor a position of a peer input device via the second transceiver based on a radio signal exchanged between the input device and the peer input device; and
   in response to a determination that the position of the peer input device is less than a threshold distance, generate a collision alert on the display device via the first transceiver.

2. The wearable apparatus of claim 1, wherein the display device is a head-mounted display (HMD) device.

3. The wearable apparatus of claim 1, wherein the processor is to utilize the first transceiver to communicate with the display device via a wired connection, and wherein the processor is to utilize the second transceiver to monitor the position of the peer input device via a wireless channel.

4. The wearable apparatus of claim 1, wherein the processor is to utilize the first transceiver to communicate with the display device via a first wireless channel, and wherein the processor is to utilize the second transceiver to monitor the position of the peer input device via a second wireless channel.

5. The wearable apparatus of claim 1, wherein the processor is to:
   measure an angle-of-arrival (AoA) of the radio signal received by the input device; and
   track the position of the peer input device to monitor a distance based on the measured AoA.

6. The wearable apparatus of claim 1, wherein the processor is to:
   measure an angle-of-departure (AoD) of the radio signal from the input device; and
   track the position of the peer input device to monitor a distance based on the measured AoD.

7. A wearable apparatus comprising:
   a head-mounted display (HMD) device comprising a display panel and a first processor; and
   an input device to exchange a command and data with the HMD device, the input device comprising:

a network interface device including a first transceiver and a second transceiver; and a second processor to:

utilize the first transceiver to communicate with the HMD device via a first wireless channel;

utilize the second transceiver to monitor a distance between the input device and a peer input device via a second wireless channel; and in response to a determination that the distance is less than a threshold, transmit location data of the peer input device to the HMD device via the first transceiver, wherein the first processor is to generate a collision alert on the display panel based on the location data.

8. The wearable apparatus of claim 7, wherein the first transceiver comprises a first media access controller (MAC) and a first physical layer interface to communicate with the HMD device via the first wireless channel, and wherein the second transceiver comprises a second MAC and a second physical layer interface to monitor the distance between the input device and the peer input device via the second wireless channel.

9. The wearable apparatus of claim 7, wherein the collision alert is to visually indicate a direction of potential collision with the peer input device.

10. The wearable apparatus of claim 7, wherein the second processor is to:

measure an angle-of-arrival (AoA) of a radio signal; and track a location of the peer input device to monitor the distance based on the measured AoA.

11. The wearable apparatus of claim 7, wherein the second processor is to:

measure an angle-of-departure (AoD) of a radio signal; and track a location of the peer input device to monitor the distance based on the measured AoD.

12. The wearable apparatus of claim 7, wherein the HMD device is a virtual reality (VR) HMD device, an augmented reality (AR) HMD device, or a mixed reality HMD device.

13. The wearable apparatus of claim 7, wherein the input device is a wearable device or a hand-held device.

14. A non-transitory computer-readable storage medium encoded with instructions that, when executed by a processor of a wearable apparatus, cause the processor to:

utilize a first transceiver of an input device to communicate with a head-mounted display (HMD) device via a first wireless channel, the wearable apparatus comprises the HMD device and the input device to input data or command to the HMD device;

utilize a second transceiver of the input device to monitor a position of a peer input device relative to the input device in a physical environment via a second wireless channel, wherein the first wireless channel and the second wireless channel are to exchange communications in accordance with a wireless communication protocol; and generate a multi-stage collision alert based on the monitored position of the peer input device.

15. The non-transitory computer-readable storage medium of claim 14, wherein instructions to generate the multi-stage collision alert comprise instructions to:

generate a first collision alert when the monitored position of the peer input device relative to the input device falls below a first threshold distance; and generate a second collision alert when the monitored position of the peer input device relative to the input device falls below a second threshold distance, wherein the second collision alert is different than the first collision alert, and wherein the second threshold distance is less than the first threshold distance.

16. The non-transitory computer-readable storage medium of claim 14, wherein instructions to utilize the first transceiver to communicate with the HMD comprise instructions to:

utilize the first transceiver having a first media access controller (MAC) and a first physical layer interface to perform data communication and command communication with the HMD device, wherein the first physical layer interface is an interface between the first transceiver and the first wireless channel.

17. The non-transitory computer-readable storage medium of claim 14, wherein instructions to utilize the second transceiver to monitor the position of the peer input device comprise instructions to:

utilize the second transceiver having a second media access controller (MAC) and a second physical layer interface to monitor the position of the peer input device relative to the input device, wherein the second physical layer interface is an interface between the second transceiver and the second wireless channel.

18. The non-transitory computer-readable storage medium of claim 14, wherein the first transceiver is a first Bluetooth transceiver, wherein the second transceiver is a second Bluetooth transceiver, wherein the first wireless channel is a first Bluetooth channel, and wherein the second wireless channel is a second Bluetooth channel.

19. The non-transitory computer-readable storage medium of claim 14, wherein the HMD device is a virtual reality (VR) HMD device, an augmented reality (AR) HMD device, or a mixed reality HMD device.

20. The non-transitory computer-readable storage medium of claim 14, wherein the multi-stage collision alert comprises a visual alert outputted on a display panel of the HMD device, an audible alert outputted via an audio device of the HMD device, a haptic alert outputted via the input device, or any combination thereof.

* * * * *